US012146640B2

(12) United States Patent
Wenrick et al.

(10) Patent No.: US 12,146,640 B2
(45) Date of Patent: Nov. 19, 2024

(54) WEARABLE LIGHTING APPARATUS

(71) Applicant: Atomic Enterprises LLC, Cloverdale, OR (US)

(72) Inventors: Dane E. Wenrick, Cloverdale, OR (US); Keenan Wenrick, Hillsboro, OR (US); Emily Griffith, Cloverdale, OR (US)

(73) Assignee: Atomic Enterprises LLC, Cloverdale, OR (US)

( * ) Notice: Subject to any disclaimer, the term of this patent is extended or adjusted under 35 U.S.C. 154(b) by 0 days.

(21) Appl. No.: 18/323,982

(22) Filed: May 25, 2023

(65) Prior Publication Data

US 2023/0296232 A1 Sep. 21, 2023

Related U.S. Application Data

(60) Provisional application No. 63/359,693, filed on Jul. 8, 2022.

(51) Int. Cl.

| | |
|---|---|
| ***F21V 21/14*** | (2006.01) |
| ***A45F 3/14*** | (2006.01) |
| ***F21V 21/28*** | (2006.01) |

(52) U.S. Cl.
CPC .............. *F21V 21/145* (2013.01); *A45F 3/14* (2013.01); *F21V 21/28* (2013.01)

(58) Field of Classification Search
CPC ........ F21V 21/145; F21V 21/28; F21V 21/32; F21V 21/26; F21V 21/14; F21V 21/00;
(Continued)

(56) References Cited

U.S. PATENT DOCUMENTS

| | | | | |
|---|---|---|---|---|
| 2,506,685 A * | 5/1950 | Checkowitz | .............. | A45F 5/00 362/108 |
| 5,097,400 A * | 3/1992 | Cvek | .................... | F16M 11/105 362/345 |

(Continued)

FOREIGN PATENT DOCUMENTS

| | | |
|---|---|---|
| CN | 204617391 U | 12/2015 |
| CN | 107701969 A | 10/2017 |

(Continued)

OTHER PUBLICATIONS

International Search Report and Written Opinion of the International Searching Authority, mailed Sep. 29, 2023, for corresponding International Application No. PCT/US2023/068286, 13 pages.

(Continued)

*Primary Examiner* — Bao Q Truong
(74) *Attorney, Agent, or Firm* — Klarquist Sparkman, LLP

(57) ABSTRACT

A lighting apparatus includes a frame structure, a pair of shoulder straps coupled to the frame structure, wherein the shoulder straps are configured to be worn on the shoulders of a user such that the frame structure is adjacent the user's back, at least one support arm having a first end coupled to the frame structure and a second end, and at least one light source coupled to the second end of the support arm. The support arm is configured to support the light source above the shoulders of a user such that the light source can project light in front of the user.

19 Claims, 7 Drawing Sheets

(58) Field of Classification Search
CPC ...... F21V 33/00; F21V 33/0004; F21V 14/02; F21V 21/30; A45F 3/14; F21W 2131/402
See application file for complete search history.

(56) References Cited

U.S. PATENT DOCUMENTS

| | | | | |
|---|---|---|---|---|
| 6,315,426 | B1 * | 11/2001 | Buller, Jr. | A45F 5/00 362/108 |
| 8,282,235 | B2 * | 10/2012 | Gilligan | A45C 15/06 362/570 |
| 9,027,894 | B2 | 5/2015 | Sapper et al. | |
| 9,483,918 | B2 * | 11/2016 | Uriarte | A41D 13/01 |

FOREIGN PATENT DOCUMENTS

| | | | |
|---|---|---|---|
| CN | 216345569 | U | 12/2021 |
| IT | CL20120002 | A1 | 7/2021 |

OTHER PUBLICATIONS

Amazon, https://www.amazon.com/Stansport-Deluxe-Freighter-Aluminum-Frame/dp/B001RL5PHY?ref_=fplfs&smid=ATVP%E2%80%A6&source=ps-sl-shoppingads-lpcontext&th=1, "Stansport Freighter Aluminum Pack Frame (574-F), Black," printed Sep. 1, 2024, 8 pages.

Flycam-Proaimusa, https://www.proaimusa.com/pages/search-results-page?q=flycam, printed Sep. 1, 2024, 7 pages.

* cited by examiner

WEARABLE LIGHTING APPARATUS

CROSS REFERENCE TO RELATED APPLICATION

This application claims the benefit of U.S. Provisional Patent Application No. 63/359,693, filed Jul. 8, 2022, which is incorporated herein by reference.

FIELD

The present disclosure pertains to a wearable lighting apparatus, such as for lighting a workspace.

BACKGROUND

Construction sites often lack suitable lighting for workers due to lack of permanently installed lighting systems and or lack of electrical power at the site. In such cases, temporary lighting systems may be installed or portable lighting systems may be used. Portable lighting systems, such as lamps placed on the floor, typically do not provide sufficient illumination for certain tasks. For example, in the case of drywallers, it is important illuminate the area directly in front of the drywaller, such as when applying joint compound (also known as drywall mud) along seams between sections of drywall to ensure the joint compound is evenly applied, when subsequently sanding the previously applied joint compound and when inspecting the work for imperfections in the finish. Oftentimes, the drywaller must stop what they are doing to move a lamp from one location to another to increase the amount of light in front of the drywaller. This may also require the drywaller to unplug and reposition the plug of the electrical cord to a closer electrical outlet. As can be appreciated, repositioning lamps is extremely inconvenient, time-consuming, and physically tasking, especially if the drywaller is using a ladder or stilts to access hard to reach locations. Thus, what is needed is a wearable lighting apparatus that can be worn by a person and provide sufficient illumination for the worker as they move about the workspace.

SUMMARY

In one representative example, a lighting apparatus includes a frame structure, a pair of shoulder straps coupled to the frame structure, wherein the shoulder straps are configured to be worn on the shoulders of a user such that the frame structure is adjacent the user's back, at least one support arm having a first end coupled to the frame structure and a second end, and at least one light source coupled to the second end of the support arm. The support arm is configured to support the light source above the shoulders of a user such that the light source can project light in front of the user.

In some examples, the at least one support arm is moveable relative to the frame structure to adjust the position of the light source relative to the user.

In some examples, the at least one support arm comprises a lower segment and an upper segment pivotably coupled to the lower segment.

In some examples, the lower segment is pivotably coupled to the frame structure.

In some examples, the lighting apparatus further comprises a counter-balance mechanism coupling the lower segment to the upper segment.

In some examples, the at least one support arm comprises first and second support arms.

In some examples, the first and second support arms are connected to a cross-member of the frame structure.

In some examples, the lighting apparatus further comprises one or more batteries supported by the frame structure, wherein the batteries are electrically connected to the at least one light source.

In some examples, the lighting apparatus is configured to sit upright when placed on the ground or a support surface.

In some examples, the lighting apparatus further comprises one or more accessories mounted on the frame.

In another representative example, a lighting apparatus comprises a support structure, a pair of shoulder straps coupled to the support structure, wherein the shoulder straps are configured to be worn on the shoulders of a user such that the support structure is adjacent the user's back, at least one adjustable support arm coupled to the support structure, and at least one light source coupled to the support arm. The support arm is configured to support the light source above the shoulders of a user such that the light source can project light in front of the user.

In another representative example, a method comprises placing a lighting apparatus on a user such that a support structure of the lighting apparatus is adjacent the user's back, wherein the lighting apparatus comprises at least one support arm coupled to the support structure and at least one light source coupled to the support arm; positioning the support arm to support the light source above the user's shoulders; and projecting light in front of the user with the light source.

The various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosure will become more apparent from the following detailed description, claims, and accompanying figures.

DETAILED DESCRIPTION

General Considerations

Figure 1:
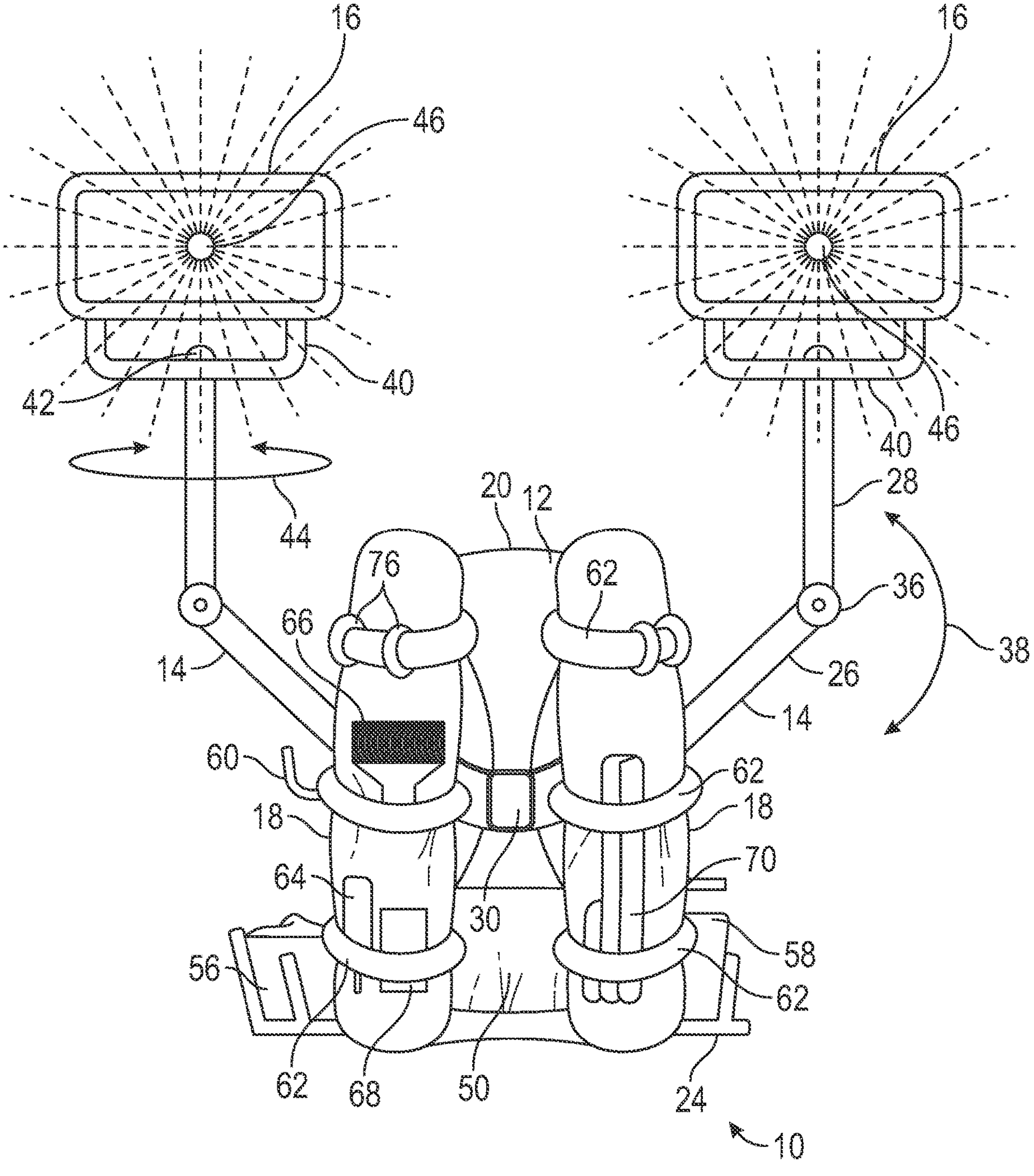
FIG. 1 is a front elevation view of a lighting apparatus, according to one example.

For purposes of this description, certain aspects, advantages, and novel features of examples of this disclosure are described herein. The disclosed methods, apparatus, and systems should not be construed as being limiting in any way. Instead, the present disclosure is directed toward all novel and nonobvious features and aspects of the various disclosed examples, alone and in various combinations and sub-combinations with one another. The methods, apparatus, and systems are not limited to any specific aspect or feature or combination thereof, nor do the disclosed examples require that any one or more specific advantages be present or problems be solved.

Although the operations of some of the disclosed examples are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the term "coupled" generally means physically, mechanically, chemically, magnetically, and/or electrically coupled or linked and does not exclude the presence of intermediate elements between the coupled or associated items absent specific contrary language.

Examples of Disclosed Technology

FIGS. 1-6 show a wearable lighting apparatus 10, according to one example. The lighting apparatus 10 generally comprises a support structure 12 (also referred to as a frame structure in some examples), one or more support arms 14 coupled to the support structure 12, one or more light sources 16 supported by the support arms 14, and shoulder straps 18 coupled to the support structure 12. The shoulder straps 18 can be adjustable to fit different users.

Figure 3:
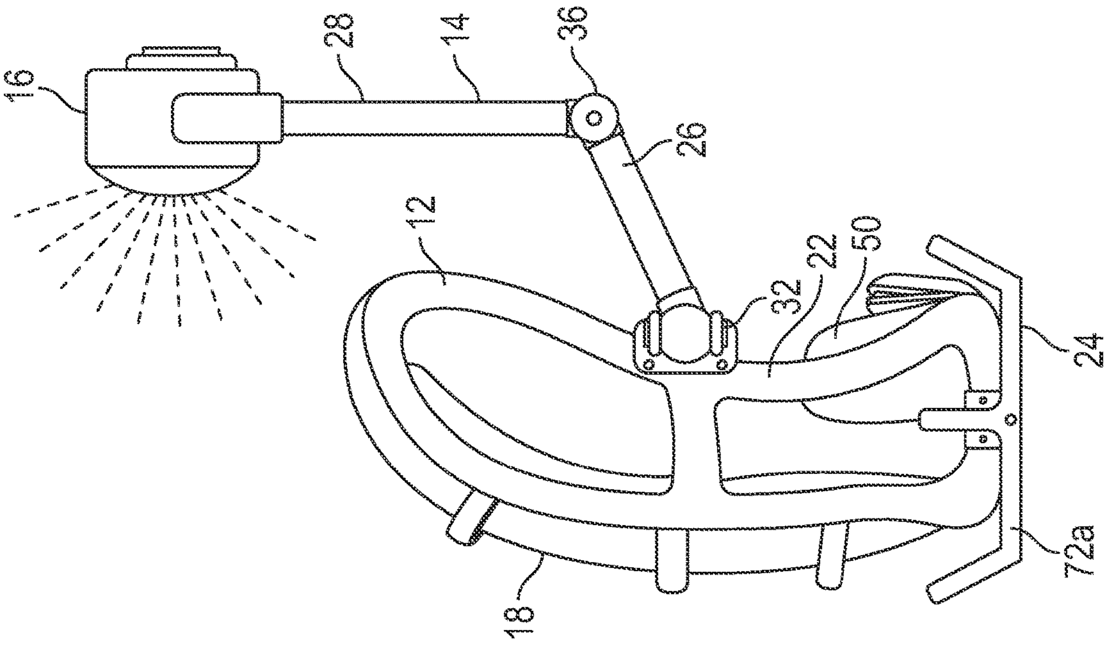
FIG. 3 is a side elevation view of one side of the lighting apparatus of FIG. 1.
Figure 4:
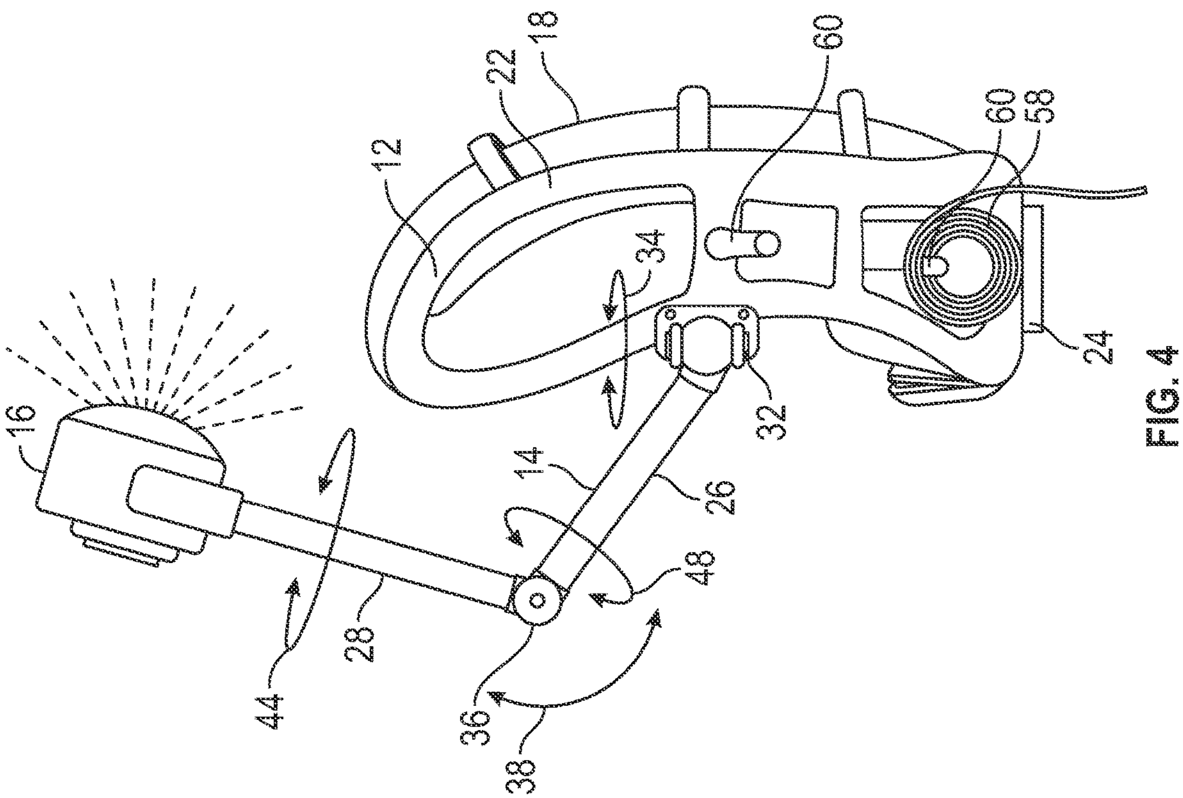
FIG. 4 is a side elevation view of the opposite side of the lighting apparatus of FIG. 1.
Figure 6:
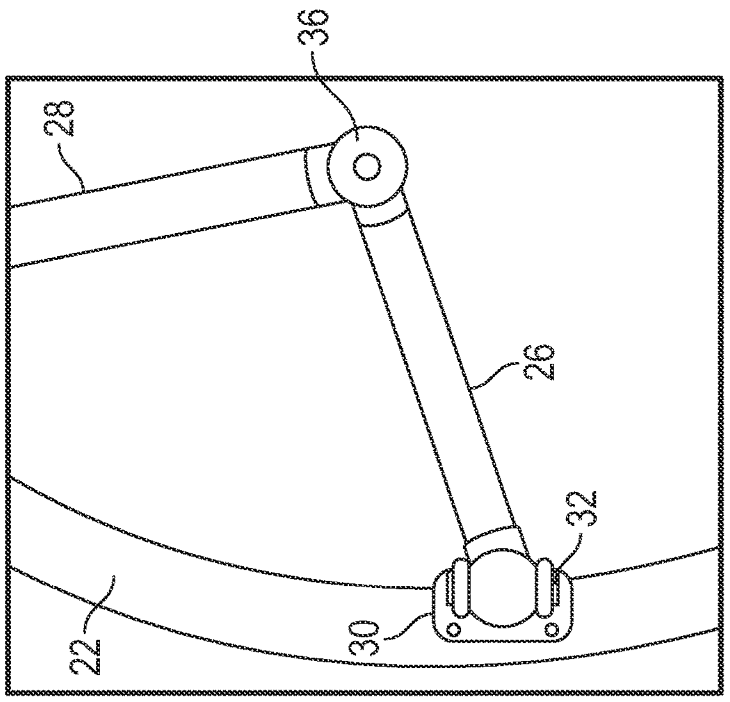
FIG. 6 is an enlarged side view of one of the support arms of the lighting apparatus of FIG. 1.
Figure 5:
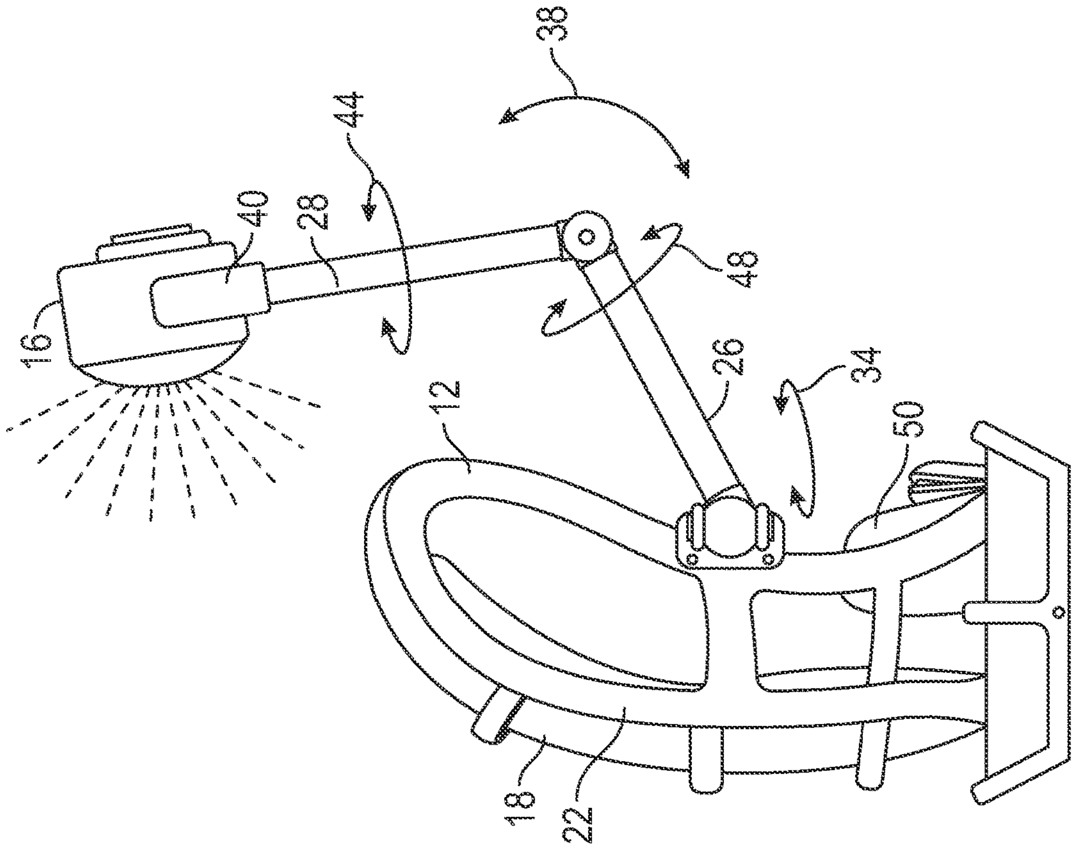
FIG. 5 is another side elevation view of the lighting apparatus similar to FIG. 3.

The support structure 12 in the illustrated example comprises an open-frame structure having a rear support member 20 and two side support members 22. A base member 24 can be connected to the lower end portions of the side supports members 22 and can extend laterally therebetween. As best shown in FIGS. 3-4, each shoulder strap 18 can be secured to a front portion of a respective side support member 22. The shoulder straps 18 are configured to be worn on the shoulders of a user such that support structure 12 lies against the back of the user, as further described below. The shoulder straps 18 can comprise padding, such as high-density form, for cushioning the weight of the lighting apparatus against the user's shoulders.

The lighting apparatus 10 in the illustrated example includes two support arms 14 and two light sources 16, each of which is supported by a respective support arm 14. In other examples, the lighting apparatus 10 can include only one support arm 14 or more than two support arms, such as three, four or more support arms 14. Moreover, in other examples, each support arm 14 can support more than one light source 16, such as two, three, four or more light sources 16.

Figure 2:
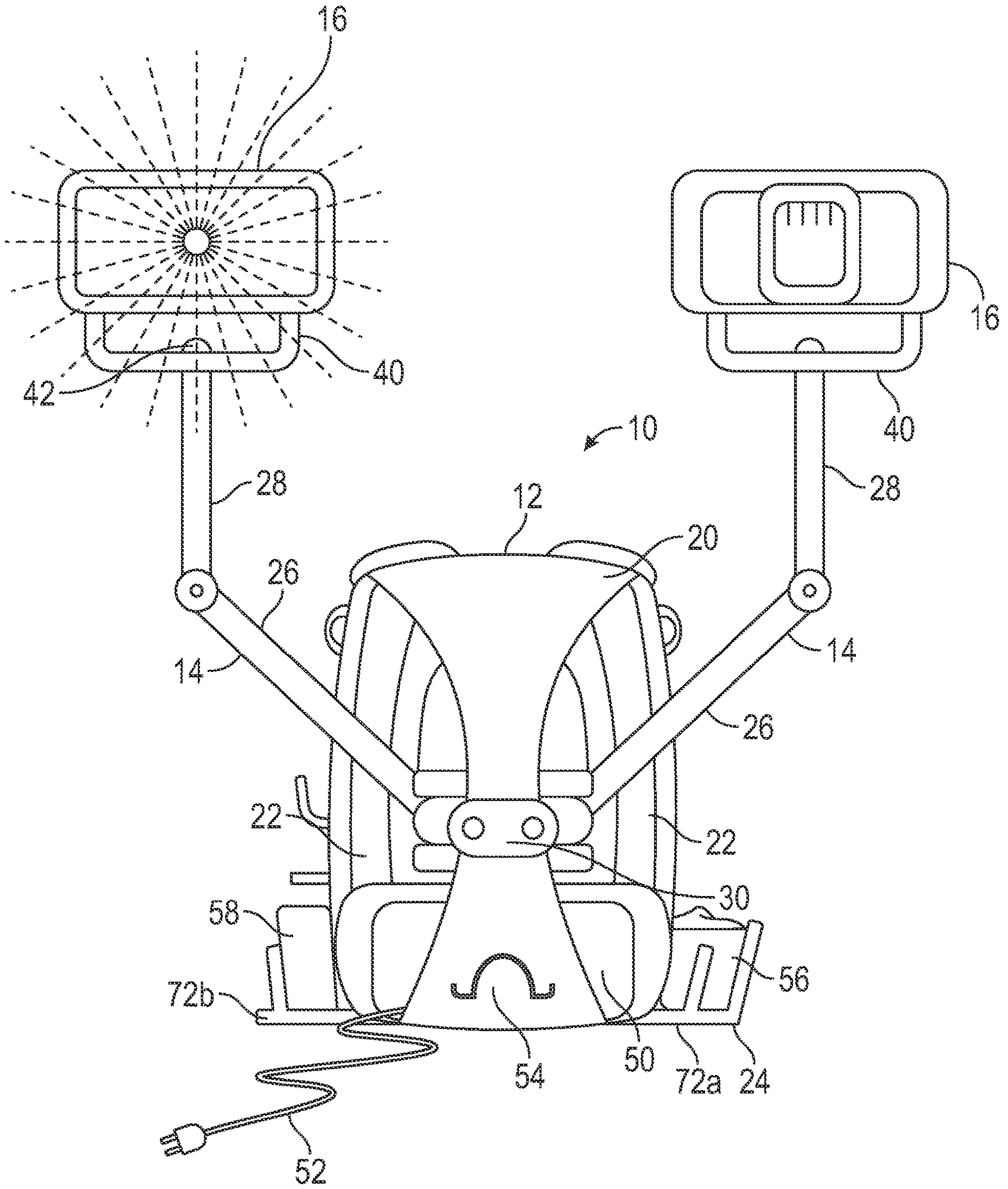
FIG. 2 is a rear elevation view of the lighting apparatus of FIG. 1.

The support arms 14 are configured to be adjustable relative to the support structure 12 in at least one direction to position the light sources 16 at different positions relative to the support structure 12 and the user. As best shown in FIG. 2, for example, each support arm 14 can include a lower segment 26 and an upper segment 28 coupled to the lower segment 26. The lower ends of the lower segments 26 can be coupled to respective ends of a cross member 30, which can be fixed to the rear support member 20 of the support structure 12, such as with fasteners (e.g., screws) or by welding.

As best shown in FIG. 4, the lower ends of the lower segments 26 can be coupled to the cross member 30 by respective pivot joints 32 that allow the support arms 14 to pivot fore and aft relative to support structure 12 about vertical pivot axes in the directions indicated by arrow 34. The upper ends of the lower segments 26 can be coupled to the lower ends of the upper segments 28 by respective pivot joints 36 to allow the upper segments 28 to pivot upwardly and downwardly relative to the lower segments about horizontal pivot axes in the directions indicated by arrow 38. In some examples, each pivot joint 36 can be configured to allow the upper segment 28 to pivot or rotate relative to a respective lower segment 26 about a pivot axis that is colinear with a longitudinal axis of the lower segment 26 in the directions indicated by arrow 48 (FIG. 4).

In some examples, the pivot joints 32, 36 and/or the support arms 14 can be configured to permit adjustment of the lower and upper segments of the support arms about the various axes and maintain them at their adjusted positions against the weight of the support arms 14 and the light sources and against external forces caused by movement of the user. For example, one or both of the lower segment 26 and the upper segment 28 of support arms 14 can incorporate counter-balance mechanisms, such as the technology used in articulating support arms for display monitors. One such example of a counter-balance mechanism that can be implemented in the support arms 14 is disclosed in U.S. Pat. No. 9,027,894, which is incorporated herein by reference. In some examples, the support arms 14 can incorporate gas springs, coiled springs, or hydraulic mechanisms that allow movement of lower and upper segments 26, 28 relative to each other and the support structure 12 but maintain the positions of the lower and upper segments 26, 28 once adjusted to their desired positions.

In lieu of or in addition to the use of counter-balance mechanisms, the pivot joints 32, 36 and/or the support arms 14 can include manually operated locking mechanisms, such as screws or bolts, which can be loosened to permit adjustment of a support arm and then re-tightened to retain the support arm at the adjusted position.

Each light source 16 can be rotatably coupled to a respective upper segment 28 of a support arm 14. For example, each light source 16 can have a frame member 40 that is rotatably coupled to the upper end of a respective upper segment 28 at a rotation joint 42 that allows the light source to rotate relative to the support arm 14 about a rotation axis that is colinear with a longitudinal axis of the upper segment 28 in the directions indicated by arrow 44. Each light source 16 desirably is configured to rotate 360 degrees around its respective rotation axis.

Each light source 16 can have one or more light emitting elements, such as incandescent bulbs or light emitting diodes (LED's).

The lighting apparatus 10 can include a portable power source, such as one or more batteries, to provide electrical power to the light sources 16. The power source can be positioned on the base member 24. For example, in the illustrated example, the power source can be a battery assembly 50, which may include a battery charger and one or more batteries (e.g., 20V lithium-ion batteries) removably docked within respective charging ports of the charger. The battery assembly 50 can include an electrical cord 52 that can be plugged into a standard electrical 120V outlet for charging the one or more batteries when not in use. When the batteries are charged, the cord 52 can be wrapped around a hook 54 formed in or connected to the rear support member 20 of the support structure 12 for storage (FIG. 2). The batteries can be selected to be compatible with other cordless power tools, such as a cordless drill, so that the user can use one or more of the batteries for powering other power tools that may be needed at the job site.

The lighting apparatus 10 can further include one or more user input elements, such as in form of electrical switches or buttons (not shown), for turning the light sources 16 on and off and/or for operating other optional electrically powered devices (e.g., a radio or a speaker) carried by the support structure. In some examples, lighting apparatus can include a control panel, such as a touch screen, configured to control electrical power to the light sources 16 and/or other optional electrically powered devices. The user input elements and/or a control panel can be mounted at a convenient location, such as one of the shoulder straps 18, to enable the user to easily operate the light sources and other optional electrically powered devices without removing the lighting apparatus from their back while working.

Use of conventional portable, corded lamps can present a significant tripping hazard for workers at a construction site, especially for drywallers and other workers using stilts within the workspace. Advantageously, the one or more batteries provide electrical power to the light sources and other electrically powered devices during use of the lighting apparatus, thereby eliminating the tripping hazard of a cord. In some instances, however, the cord 52 optionally may be plugged into an electrical outlet for supplying electrical power to the light sources 16 and other electrically powered devices during use of the lighting apparatus 10.

The base member 24 or other components of the support structure 12 can be configured to support other devices, tools, accessories, or products needed at the job site, including without limitation, knives (e.g., a taping or joint knife or a knife for cutting), screwdrivers, sanding sponges/pads, nail bags, pick-up tools, pans, power tools, and other electrical devices. For example, as noted above, the battery assembly 50 can be used to power other electrical devices, such as a radio or a speaker. The radio, speaker and/or other electrical devices can be positioned on and supported by the base member 24. The radio or speaker may include a Bluetooth connection for establishing a wireless connection with a music playing device, such as a smart phone. In some examples, the radio or speaker may be integrated into the battery assembly 50.

As best shown in FIG. 2, the base member 24 can include a first extension **72*a* sized to support a container 56 containing joint compound, which can be located outside and adjacent one of the side support members 22, and a second extension 72*b* sized to support a roll of drywall tape 58, which can be located outside and adjacent the other side support member 22. The extensions 72*a*, 72*b* can be integral portions of the base member 24 or separate components that can be adjusted relative to the base member (e.g., the extensions 72*a*, 72*b* can be slid laterally over or under the base member when not in use) or removed from the base member 24. As best shown in FIG. 4, at least one (or both) of the side support members 22 can include one or more hooks 60 for supporting tools or other accessories or products. The roll of drywall tape 58 can be supported on one of the hooks 60** as shown.

The shoulder straps 18 optionally can include one or more features for supporting other devices, tools, accessories, or products needed at the job site, such as any of those mentioned above. For example, one or both shoulder straps 18 can include one or more loops 62 for supporting tools, devices, accessories, or products. As one representative example, FIG. 1 shows the loops 62 supporting a screwdriver 64, a taping or joint knife 66 (which can be used for spreading joint compound), a sanding sponge 68, and a pick-up tool 70 (which can be used for picking up items on the ground without bending over).

As further shown in FIG. 1, one or more rings 76 can be placed on one or more of the loops 62 for supporting additional accessories. The rings 76 can be in the form of carabiners.

Figure 8:
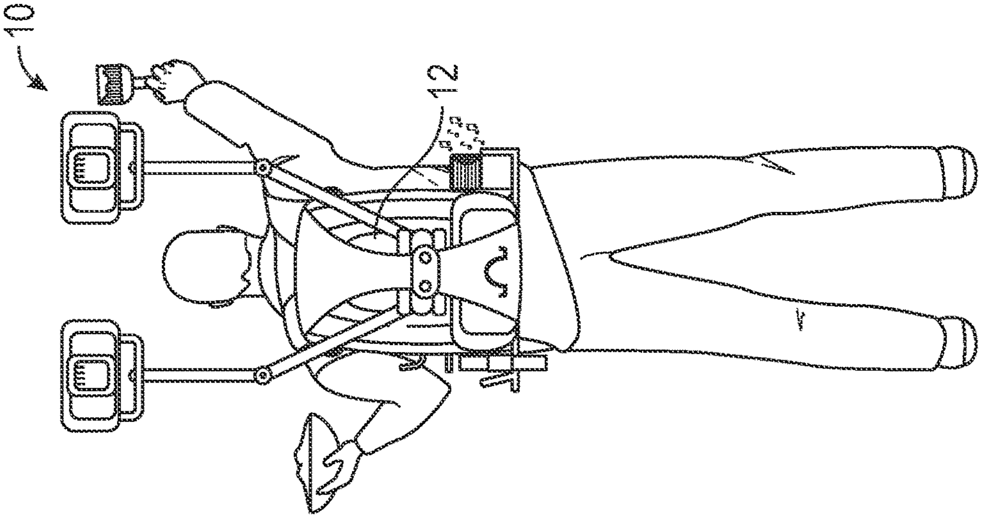
Figure 7:
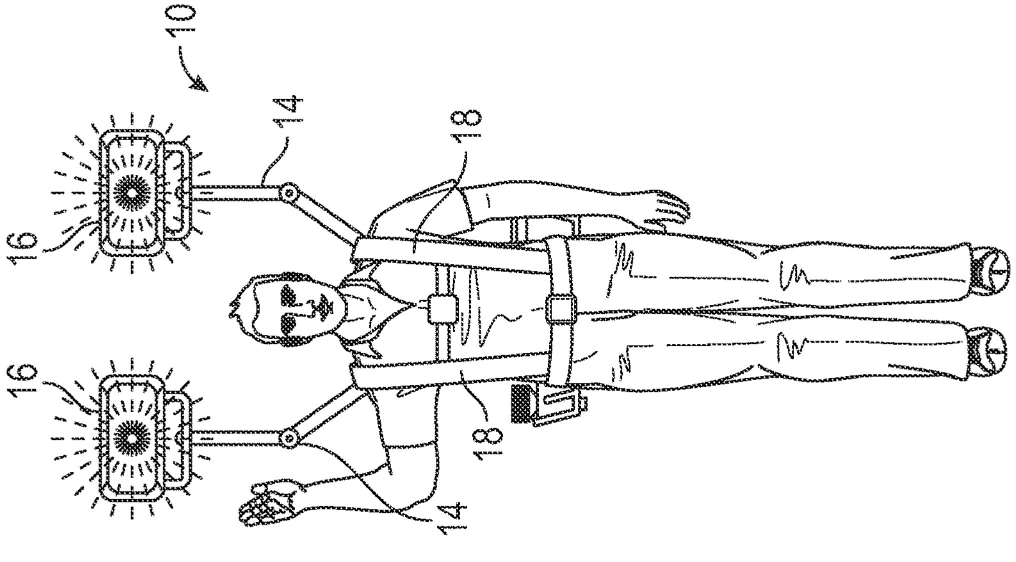
Figure 11:
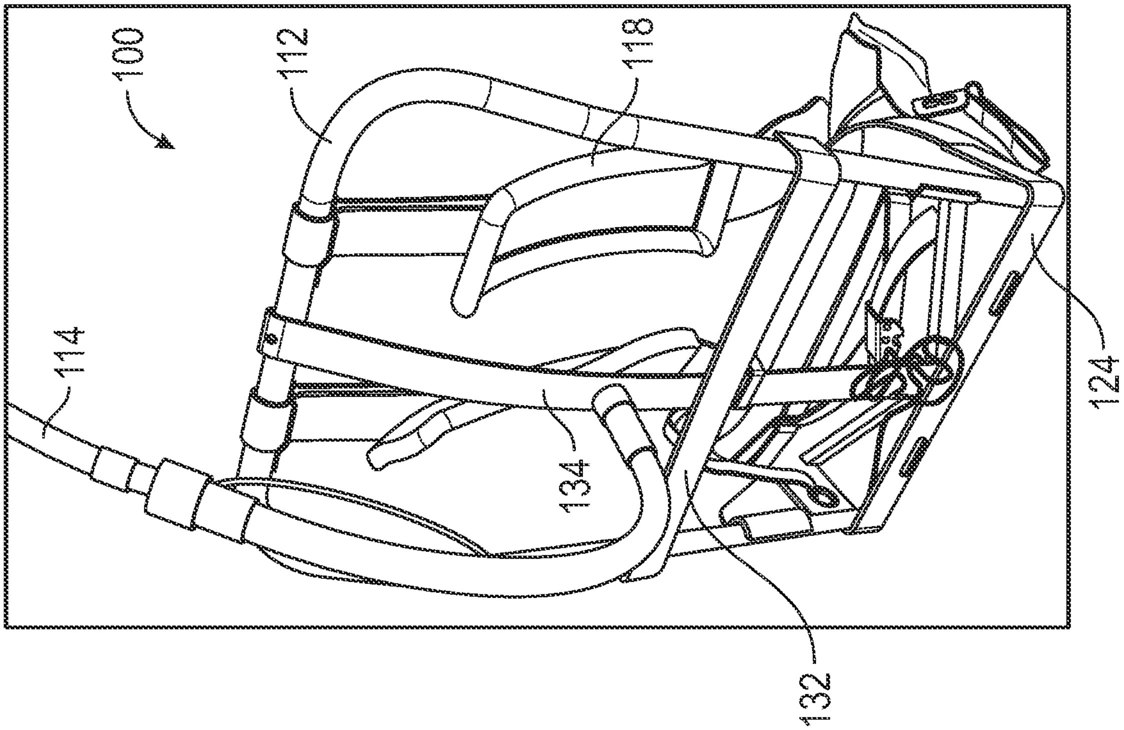
FIG. 11 is a rear perspective view of the lighting apparatus of FIG. 10.
Figure 10:
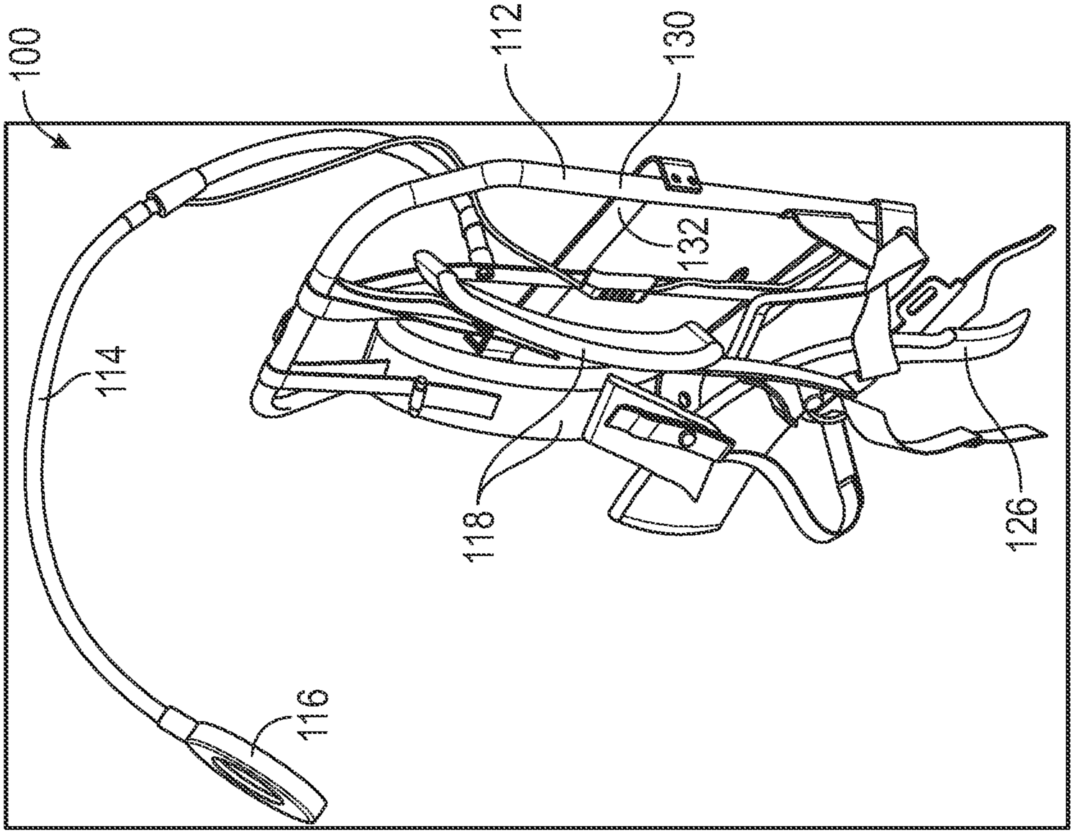
FIG. 10 is a front perspective view of a lighting apparatus, according to another example.
Figure 13:
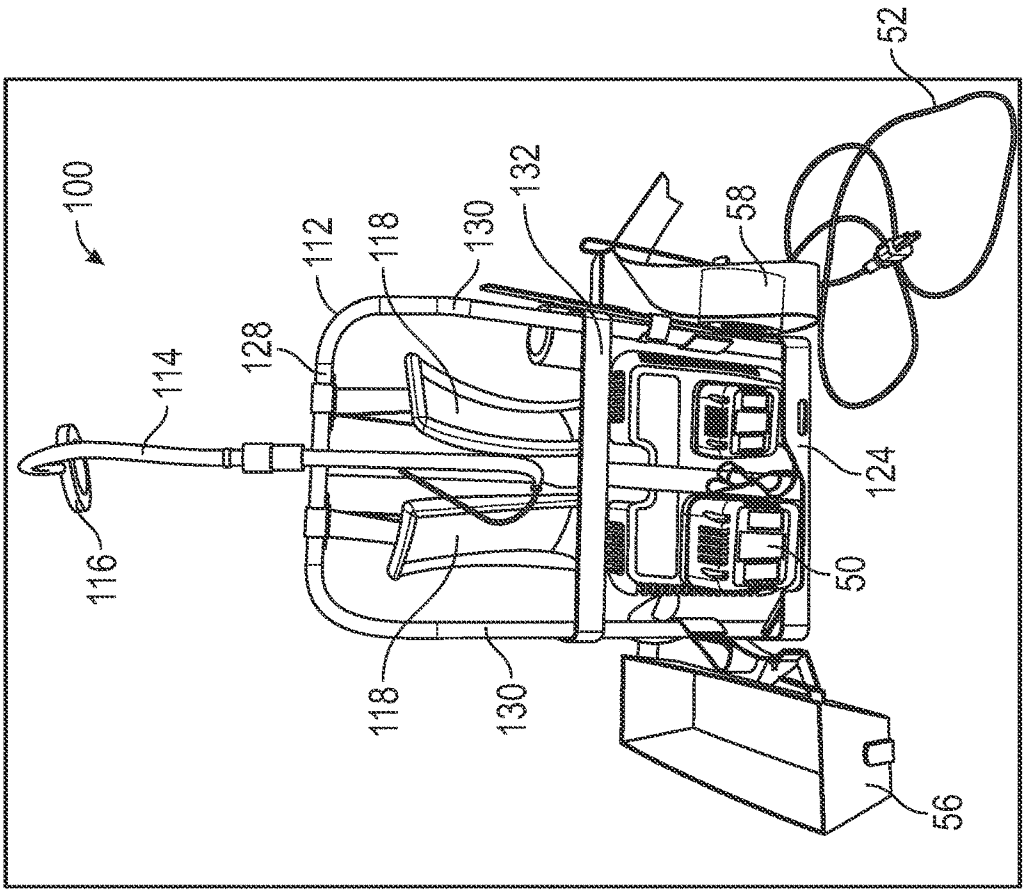
FIG. 13 is a rear elevation view of the lighting apparatus of FIG. 10.
Figure 12:
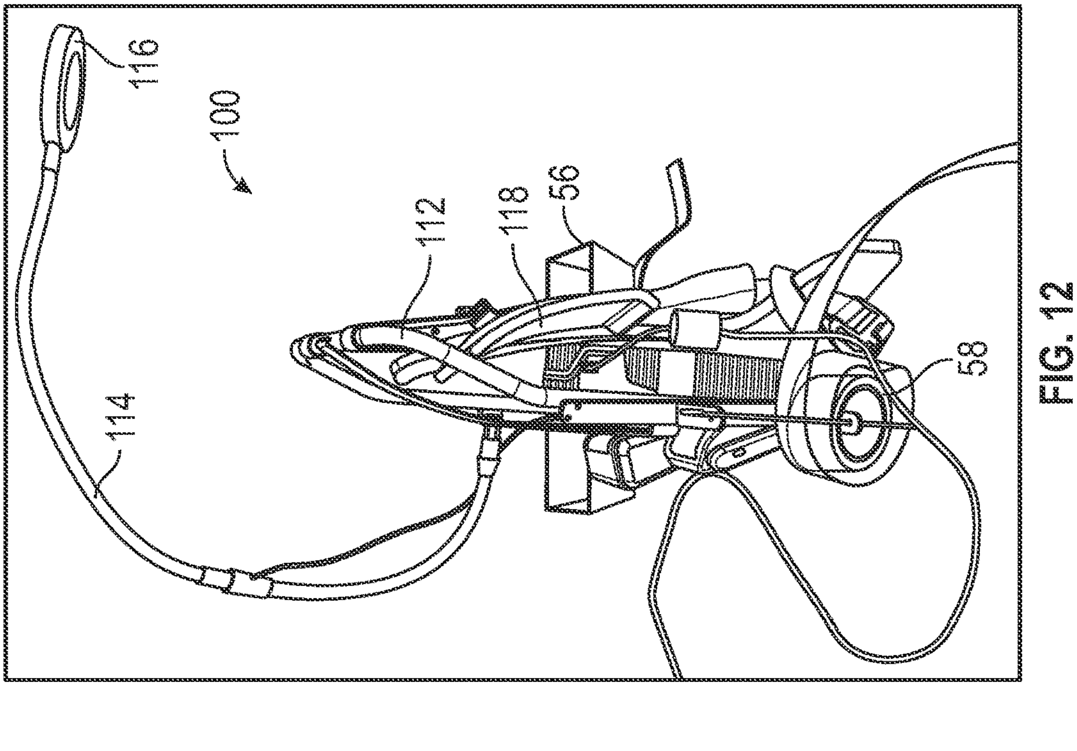
FIG. 12 is a side perspective view of the lighting apparatus of FIG. 10.

FIGS. 7-8 illustrate exemplary uses of the lighting apparatus 10. As discussed above, when worn by a user, the shoulder straps 18 are placed over the shoulders of a user such that the support structure 12 is adjacent the back of the user. The support arms 14 extend upwardly above the user's shoulders and support the light sources above the user's shoulders, and desirably above the user's head. In this manner, the light sources 16 can project light directly in front of the user to constantly illuminate the area directly in front of the user as the user moves about the workspace or when the user rotates or bends their torso while standing at one location.

Another use of the lighting apparatus 10 can include placing the lighting apparatus 10 on the ground, a floor, a table, or another support surface. The base member 24 can contact the support surface on which the lighting apparatus 10 is placed. The lighting apparatus 10 can have a center of gravity that maintains the lighting apparatus in an upright position and resists tipping when the base member 24 is placed on top of a support surface.

FIGS. 10-13 show a wearable lighting apparatus 100, according to another example. The lighting apparatus 100 generally comprises a support structure 112 (also referred to as a frame structure in some examples), at least one support arm 114, at least one light source 116 supported by the support arm 114, and shoulder straps 118 (which can be adjustable to fit different users). The apparatus 100 can further include a waist strap 126, which can be adjustable to fit different users.

The support structure 112 in the illustrated example comprises an open frame structure having an upper cross member 128, a base member 124, two upright side support members 130 extending from respective ends of the upper cross member 128 to the base member 124, a lower cross member 132 extending laterally between the side support members 130, and a middle upright support member 134 extending vertically from the upper cross member 128 to the base member 124.

The support arm 114 has a lower end fixed to the support structure 112 at a convenient location, such as to support member 134 as shown. In this manner, the lower end of the support arm 114 is connected to the support structure 112 laterally between the side supports 130. In other examples, the lower end of the support arm 114 can be fixed to the cross member 132. In some examples, the lower end of the support arm 114 is connected to the support structure (e.g., to the support member 134 or the cross member 132) at a location equidistant from the side support members 130 and/or in a vertical plane bisecting the support structure.

In some examples, the apparatus 100 can include more than one support arm 114 having a light source 116, such as two or three support arms with respective light sources (the lower ends of which can be fixed to the support member 134 and/or the cross member 132). If two support arms 114 are used, the lower ends of the support arms 114 can be fixed to the cross member 132 and in some examples, the lower ends of the support arms 114 can be fixed to the cross member 132 on opposite sides of and spaced equidistantly from a vertical plane bisecting the support structure to balance the weight of the two support arms.

Figure 9:
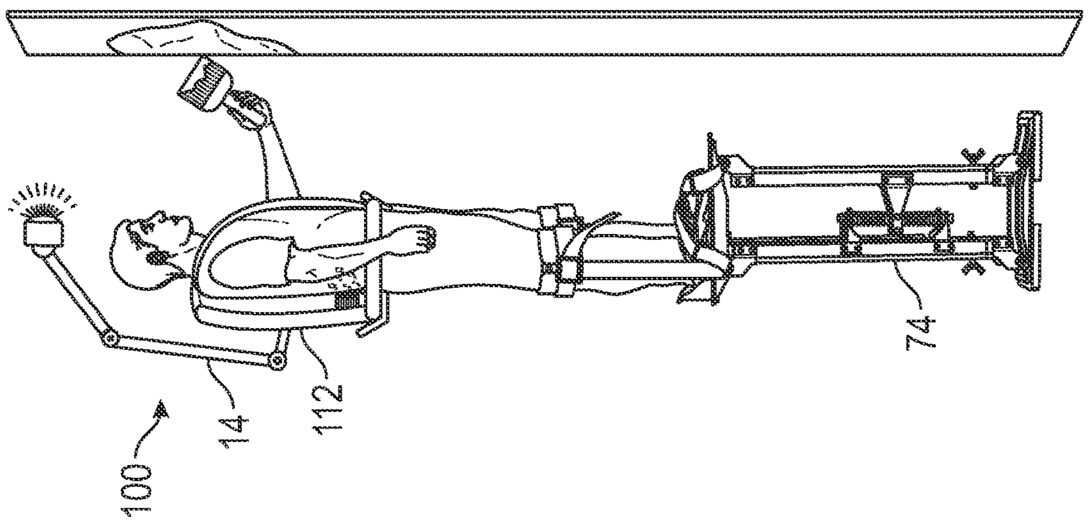
FIGS. 7, 8, and 9 illustrate exemplary uses of examples of the lighting apparatus.

The support arm 114 in FIGS. 10-13 comprises a bendable tube or shaft that can be bent or deformed to position the support arm 114 and the light source 116 at a desired position. In other examples, the support arm 114 can have separate segments connected by pivot joints, such as shown in FIG. 9 and described in detail above with respect to support arms 14, and can include counterbalance mechanisms, gas springs, coil springs, and/or hydraulic mechanisms, as previously described.

The light source 116 can be connected to the upper end of the support arm 114, and can have one or more light emitting elements, such as incandescent bulbs or LED's.

Similar to base member 24, the base member 124 can be used to support a battery assembly 50 and any of various tools or accessories described above. The battery assembly 50 can include a battery charger for charging one or more batteries and an electrical cord 52. A pan or container 56 (such as for holding joint compound) can be supported on one side of the base member. A roll 56 of dry wall tape can be supported on a support member 130.

The wearable lighting apparatus 100 can be worn on the back of a user and the support arm 114 can be adjusted to project light directly in front of a user. As shown in FIG. 9, when being worn on a user, the support structure 112 lies against the back of the user and the shoulder straps extend over the shoulders of the user. FIG. 9 shows a user wearing the lighting apparatus 100 while standing on stilts and applying joint compound to a wall. Similar to the base member 24, the base member 124 can be configured to be placed on the ground, a floor, a table or another support surface to support the apparatus in an upright position when not being worn by a user.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A lighting apparatus comprising:

a frame structure comprising an open-frame structure comprising a rear support member, a lower base member, and two upwardly extending, laterally spaced apart side support members, wherein each side support member has a lower end portion connected to the base member, which extends laterally between the lower end portions of the side support members;

a pair of shoulder straps coupled to the frame structure, wherein the shoulder straps are configured to be worn on the shoulders of a user such that the frame structure is adjacent the user's back;

at least one support arm having a first end coupled to the frame structure and a second end; and at least one light source coupled to the second end of the support arm;

wherein the support arm is configured to support the light source above the shoulders of a user such that the light source can project light in front of the user.

2. The lighting apparatus of claim 1, wherein the at least one support arm is moveable relative to the frame structure to adjust the position of the light source relative to the user.

3. The lighting apparatus of claim 1, wherein the at least one support arm comprises a lower segment and an upper segment pivotably coupled to the lower segment.

4. The lighting apparatus of claim 3, wherein the lower segment is pivotably coupled to the frame structure.

5. The lighting apparatus of claim 3, further comprising a counter-balance mechanism coupling the lower segment to the upper segment.

6. The lighting apparatus of claim 1, wherein at least one support arm comprises first and second support arms, wherein the first ends of the first and second support arms are connected to the frame structure at spaced apart locations.

7. A lighting apparatus comprising:

a frame structure;

a pair of shoulder straps coupled to the frame structure, wherein the shoulder straps are configured to be worn on the shoulders of a user such that the frame structure is adjacent the user's back;

at least one support arm having a first end coupled to the frame structure and a second end; and at least one light source coupled to the second end of the support arm;

wherein the support arm is configured to support the light source above the shoulders of a user such that the light source can project light in front of the user;

wherein at least one support arm comprises first and second support arms;

wherein the first and second support arms are connected to a cross member of the frame structure.

8. The lighting apparatus of claim 1, further comprising one or more batteries supported by the frame structure, wherein the batteries are electrically connected to the at least one light source.

9. The lighting apparatus of claim 1, wherein the lighting apparatus is configured to sit upright when placed on the ground or a support surface.

10. The lighting apparatus of claim 1, wherein the base member comprises an extension portion that extends laterally beyond one of the side support members, wherein the extension portion is configured to support one or more accessories, wherein the extension portion extends laterally away from the user's back to a location adjacent the user's side when the lighting apparatus is worn by the user.

11. A lighting apparatus comprising:

a support structure;

a pair of shoulder straps coupled to the support structure, wherein the shoulder straps are configured to be worn on the shoulders of a user such that the support structure is adjacent the user's back;

at least one adjustable support arm coupled to the support structure; and at least one light source coupled to the support arm;

wherein the support arm is configured to support the light source above the shoulders of a user such that the light source can project light in front of the user;

wherein the support structure comprises two upright side support members and a lower end of the support arm is connected to the support structure at a location laterally between the side support members.

12. The lighting apparatus of claim 11, wherein the support structure comprises an open-frame structure.

13. The lighting apparatus of claim 11, wherein the support structure comprises a base member configured to support the lighting apparatus in an upright position when placed in the ground or a support surface.

14. The lighting apparatus of claim 11, a container for containing joint compound removably coupled to the support structure.

15. The lighting apparatus of claim 11, wherein the support arm is bendable.

16. The lighting apparatus of claim 11, wherein the support arm comprises two or more segments pivotably coupled to each other.

17. A method comprising:

placing a lighting apparatus on a user such that a support structure of the lighting apparatus is adjacent the user's back, wherein the support structure comprises an open-frame structure comprising a rear support member centered at the user's back, a lower base member, and two upwardly extending, laterally spaced apart side support members, wherein each side support member has a lower end portion connected to the base member, which extends laterally between the lower end portions of the side support members, wherein the lighting apparatus comprises at least one support arm coupled to the support structure and at least one light source coupled to the support arm;

positioning the support arm to support the light source above the user's shoulders; and projecting light in front of the user with the light source.

18. The method of claim 17, wherein placing the lighting apparatus on the user comprises placing shoulder straps of the lighting apparatus over the user's shoulders.

19. The method of claim 17, wherein the light source is supported above the user's head.

* * * * *